(12) United States Patent
Nishida et al.

(10) Patent No.: US 9,834,848 B2
(45) Date of Patent: Dec. 5, 2017

(54) SN-PLATED STAINLESS STEEL SHEET (71) Applicant: NISSHIN STEEL CO., LTD., Tokyo (JP)

(72) Inventors: Yoshikatsu Nishida, Osaka (JP); Masayoshi Tatano, Osaka (JP); Takahiro Fujii, Osaka (JP); Masashi Hiraoka, Osaka (JP); Masao Nagao, Osaka (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 0 days.

(21) Appl. No.: 15/321,851

(22) PCT Filed: Jul. 29, 2014

(86) PCT No.: PCT/JP2014/069875
§ 371 (c)(1),
(2) Date: Dec. 23, 2016

(87) PCT Pub. No.: WO2015/198495
PCT Pub. Date: Dec. 30, 2015

(65) Prior Publication Data
US 2017/0159197 A1  Jun. 8, 2017

(30) Foreign Application Priority Data
Jun. 25, 2014 (JP) .................... 2014-129927

(51) Int. Cl.
*B32B 15/01* (2006.01)
*C25D 5/12* (2006.01)

(52) U.S. Cl.
CPC .............. *C25D 5/12* (2013.01); *B32B 15/015* (2013.01)

(58) Field of Classification Search
None
See application file for complete search history.

(56) References Cited

U.S. PATENT DOCUMENTS 6,528,181 B1  3/2003 Yamane et al.
7,984,841 B2  7/2011 Sakuyama
(Continued)

FOREIGN PATENT DOCUMENTS

CN  1282276 A  1/2001
CN  101771142 A  7/2010
(Continued)

OTHER PUBLICATIONS

Angstrom Sciences, "Density of Elements Chart", http://www.angstromsciences.com/density-elements-chart, accessed Jun. 5, 2017.*

(Continued)

*Primary Examiner* — Seth Dumbris
(74) *Attorney, Agent, or Firm* — Rothwell, Figg, Ernst & Manbeck, P.C.

(57) ABSTRACT

A tin-plated stainless steel sheet which has a tin plating layer having good adhesion to a stainless steel sheet and exhibits excellent whisker resistance in various environments, and wherein a nickel plating layer having a thickness of 0.3-3 μm is formed on a stainless steel sheet, and a tin plating layer having a thickness of 0.3-5 μm is formed on the nickel plating layer. This tin-plated stainless steel sheet is characterized in that nickel crystals in the nickel plating layer have a lattice distortion of 0.5% or less.

2 Claims, 2 Drawing Sheets (56) References Cited

U.S. PATENT DOCUMENTS

| | | |
|---|---|---|
| 2002/0187364 A1 | 12/2002 | Heber et al. |
| 2004/0072012 A1 | 4/2004 | Yoshihara et al. |
| 2013/0071738 A1 | 3/2013 | Wang |
| 2013/0086971 A1 | 4/2013 | Tomomori et al. |
| 2015/0259813 A1 | 9/2015 | Kodama et al. |

FOREIGN PATENT DOCUMENTS

| | | | |
|---|---|---|---|
| CN | 102782193 A | 11/2012 | |
| JP | 53-115623 A | 10/1978 | |
| JP | 57-67187 A | 4/1982 | |
| JP | 59-143089 A | 8/1984 | |
| JP | 61-6293 A | 1/1986 | |
| JP | 62-30896 A | 2/1987 | |
| JP | 62-77481 A | 4/1987 | |
| JP | 2-138493 A | 5/1990 | |
| JP | H05171488 | * 7/1993 | .............. C25D 3/12 |
| JP | 2001-246317 A | 9/2001 | |
| JP | 2002-249885 A | 9/2002 | |
| JP | 2003-49293 A | 2/2003 | |
| JP | 2006-127939 A | 5/2006 | |
| JP | 2006-265637 A | 10/2006 | |
| JP | 2007-177311 A | 7/2007 | |
| JP | 2007-262458 A | 10/2007 | |
| JP | 2012-140678 A | 7/2012 | |
| TW | 201413055 A | 4/2014 | |
| WO | 99/25486 A1 | 5/1999 | |
| WO | 2006/134665 A1 | 12/2006 | |

OTHER PUBLICATIONS

Office Action dated Sep. 2, 2014 in corresponding Japanese Patent Application No. 2014-129927 (with an English translation) (7 pages).

Office Action dated Jul. 11, 2017 in corresponding Chinese Patent Application No. 201480080042.9 (with an English translation) (12 pages).

* cited by examiner

SN-PLATED STAINLESS STEEL SHEET

CROSS REFERENCE TO RELATED APPLICATION

This application is a 35 U.S.C. 371 National Phase Entry Application from PCT/JP2014/069875, filed Jul. 29, 2014, which claims priority to Japanese Patent Application No. 2014-129927, filed Jun. 25, 2014, the disclosures of which are incorporated herein in their entirety by reference.

TECHNICAL FIELD

The present invention relates to a Sn-plated stainless steel sheet. More specifically, the present invention relates to a Sn-plated stainless steel sheet which can be suitably used for, for example, electrical contact components such as a connector, a lead frame and a harness plug which are used in electrical equipment, electronic equipment and the like.

BACKGROUND ART

A material made of a Cu alloy on which a Sn-plating layer is formed has been widely used for electrical contact components. In recent years, in order to miniaturize and lighten a contact component, an ordinary steel sheet or a stainless steel sheet, which has a material strength higher than that of a Cu alloy even though the sheet has a small sheet thickness, has been used as a base material for Sn-plating (for example, Patent Literatures 1 to 4). The stainless steel sheet has a material strength higher than that of the ordinary steel sheet and is excellent in corrosion resistance of a cut edge portion after cutting processing for forming a contact component. Therefore, the stainless steel sheet is suitable for the base material for Sn-plating.

With regard to an electrical contact material having a Sn-plating layer, due to internal stress (compressive stress) generated in the Sn-plating layer, for example, electrodeposition stress at Sn-plating, stress generated at the formation of a Sn alloy which is formed by diffusion of a metal from the base material metal and the like, a needle-like single crystal which is called as a whisker is generated from the Sn-plating layer. When the whisker is generated, there is a possibility that some troubles are caused by a short circuit. Therefore, a material having whisker resistance has been required for an electrical contact material. Conventionally, in order to suppress the generation of a whisker in a Cu alloy material, various counter-measures have been studied. In recent years, in order to suppress the generation of a whisker from a Sn-plating layer in stainless steel as well as the Cu alloy material, there has been studied to form a Ni-plating layer under the Sn-plating layer, or carry out a reflow treatment of the stainless steel.

However, the mechanism of generation of a whisker from the Sn-plating layer has not yet been elucidated, and the mechanism of generation of a whisker varies depending on a kind of a base material being used, a thickness of a plating layer, a surrounding environment and the like.

A whisker has hitherto been investigated under various testing environments and by various testing methods (see, for example, Non-patent Literature 1). It has been confirmed that a whisker is generated by compressive stress which is generated in a Sn-plating layer due to oxidation of the Sn-plating layer, difference in coefficient of thermal expansion between a base material and an underlying plating layer and the like under an environment such as a high-temperature and high-humidity environment, an environment where a temperature is rapidly changed and a low temperature condition and a high temperature condition are repeated in a short period of time.

In recent years, it has been desired to develop a stainless steel sheet having whisker resistance under various environments, which has a Sn-plating layer excellent in adhesion to the stainless steel sheet which is used as a base material of an electrical contact material.

PRIOR ART LITERATURES

Patent Literatures

Patent Literature 1: Japanese Patent Unexamined Publication No. 2006-265637
Patent Literature 2: Japanese Patent Unexamined Publication No. 2007-262458
Patent Literature 3: WO 1999/025486
Patent Literature 4: Japanese Patent Unexamined Publication No. 2012-140678

Non-Patent Literature

Non-patent Literature 1: Standard enacted by Japan Electronics and Information Technology Industries Association "Whisker test methods for electronic connectors (JEITA RC-5241)", Japan Electronics and Information Technology Industries Association

SUMMARY OF THE INVENTION

Problems to be Solved by the Invention

The present invention has been made in view of the above-mentioned prior art. An object of the present invention is to provide a Sn-plated stainless steel sheet having a Sn-plating layer excellent in adhesion to the stainless steel sheet, which is excellent in whisker resistance under various environments.

Means for Solving the Problems

The present invention relates to:
(1) a Sn-plated stainless steel sheet, including a stainless steel sheet, a Ni-plated layer having a thickness of 0.3 to 3 μm formed on the stainless steel sheet, and a Sn-plating layer having a thickness of 0.3 to 5 μm formed on the Ni-plating layer, wherein a Ni crystal of the Ni-plating layer has a lattice distortion of 0.5% or less, and
(2) the Sn-plated stainless steel sheet according to the above item (1), to which a reflow treatment has not been subjected.

In the present invention, the Sn-plated stainless steel sheet means a stainless steel sheet in which a Ni-plating layer is formed on a stainless steel sheet, and a Sn-plating layer is formed on the Ni-plating layer.

Effects of the Invention

According to the present invention, there is provided a Sn-plated stainless steel sheet having a Sn-plating layer excellent in adhesion to the stainless steel sheet, which is excellent in whisker resistance under various environments.

MODE FOR CARRYING OUT THE INVENTION

As mentioned above, the Sn-plated stainless steel sheet of the present invention includes a stainless steel sheet, a Ni-plating layer having a thickness of 0.3 to 3 µm formed on the stainless steel sheet and a Sn-plating layer having a thickness of 0.3 to 5 µm formed on the Ni-plating layer, in which a Ni crystal of the Ni-plating layer has a lattice distortion of 0.5% or less.

The present inventors have earnestly studied in view of the above-mentioned prior art. As a result, it was found out that generation of a whisker is suppressed even under an environment where generation of a whisker has conventionally been observed, when a Ni-plating layer having a specific thickness is provided between a stainless steel sheet and a Sn-plating layer, a lattice distortion of a Ni crystal of the Ni-plating layer is controlled to 0.5% or less, and a thickness of the Sn-plating layer is controlled to a specific thickness. The present invention has been accomplished on the basis of the above findings.

Examples of the stainless steel sheet include, for example, a sheet of austenitic stainless steel such as SUS301, SUS304 and SUS316; a sheet of ferritic stainless steel such as SUS430, SUS430LX and SUS444; a sheet of martensitic stainless steel such as SUS410 and SUS420, which are prescribed in JIS; and the like. The present invention is not limited only to those exemplified ones.

It is preferred that the surface of the stainless steel sheet which is used in plating is smooth. When the surface of the stainless steel sheet is smooth, a pinhole is hardly generated in a plated metal since the plated metal is deposited in the form of a sheet on the surface of the stainless steel sheet, and grows up homogeneously. Therefore, the smoothness of the surface of the stainless steel sheet is preferably 0.3 µm or less, and more preferably 0.2 µm or less when the smoothness is determined as an Arithmetical mean deviation of roughness profile (Ra) in accordance with JIS B0601.

Incidentally, pretreatment of the stainless steel sheet, such as degreasing and acid cleaning can be carried out prior to Ni-plating.

In the present invention, there is one of some characteristics in that the lattice distortion of a Ni crystal of the Ni-plating layer of the Sn-plated stainless steel sheet is 0.5% or less. It is preferred that the lattice distortion of a Ni crystal of the Ni-plating layer is as low as possible, and the lower limit of the lattice distortion is 0%.

In the present invention, the "lattice distortion of a Ni crystal" means a lattice distortion of an Ni crystal of the Ni-plating layer of the Sn-plated stainless steel sheet when the lattice distortion of a Ni crystal is determined by a method described in the following EXAMPLES. The lattice distortion of the Ni crystal can be determined by X-ray diffraction of the Sn-plated stainless steel sheet.

When a Ni-plating layer is formed on a stainless steel sheet, a plating bath having a low Ni-deposition efficiency is usually used. The Ni-plating layer can be formed by Ni-plating for forming a Ni-plating layer as well as activating the surface of the stainless steel sheet (hereinafter referred to as "Ni-strike plating"). After the Ni-plating layer is formed by the Ni-strike plating, a Ni-plating layer can be further formed on the formed Ni-plating layer by a plating method using a plating bath having a high Ni-deposition efficiency (hereinafter referred to as "Ni-regular plating").

It is preferred that the Ni-strike plating is carried out by an electroplating method from the viewpoint of increase in adhesion between a stainless steel sheet and a Ni-plating layer. As the electroplating method, an electroplating method using a Wood's bath has hitherto been known. In contrast, in the present invention, an electroplating method using a sulfate only bath is preferred from the viewpoint of obtaining a Sn-plated stainless steel sheet having a Sn-plating layer excellent in adhesion to the stainless steel sheet, which is excellent in whisker resistance under various environments. The electroplating method using a sulfate only bath is a preferred plating method in the present invention as compared with other plating methods using other plating baths, because not only an amount of hydrogen generated can be easily changed by changing a concentration of sulfuric acid being added, but also a Sn-plated stainless steel sheet having a Sn-plating layer excellent in adhesion to the stainless steel sheet, which is excellent in whisker resistance under various environments can be obtained by increasing orientation of the [220] face in the Miller index of a Ni-plating layer since a deposition overvoltage is high.

It is preferred that the Ni-regular plating is carried out by an electroplating method from the viewpoint of industrial formation of a Ni-plating layer. The above-mentioned electroplating method includes, for example, an electroplating method using a sulfate only bath, an electroplating method using a Watts bath, an electroplating method using a sulfamic acid bath and the like, and the present invention is not limited only to those exemplified ones. The orientation of a Ni-plating layer formed by Ni-regular plating does not depend on the kind of a plating bath used in the Ni-regular plating, and is the same as the orientation of a Ni-plating layer formed by Ni-strike plating. Therefore, it is preferred that a Ni-plating layer is formed by Ni-strike plating using a sulfate only bath as a lower layer of the Ni-plating layer, and then a Ni-regular plating is carried out from the viewpoint of obtaining a Sn-plated stainless steel sheet having a Sn-plating layer excellent in adhesion to the stainless steel sheet, which is excellent in whisker resistance under various environments.

It is preferred that the thickness of a Ni-plating layer formed on the stainless steel sheet is 0.3 µm or more from the viewpoint of suppression of generation of a whisker and increase in adhesive strength of a Ni-plating layer to a stainless steel sheet, and that the thickness is 3 µm or less since smoothness of a plating layer formed on the stainless steel sheet is lowered, and it will not be advantageous in cost when the Ni-plating layer is so thick.

Next, Sn-plating is carried out on the surface of the Ni-plating layer formed on the stainless steel sheet, to form a Sn-plating layer. The Sn plating can be carried out by any of an electroplating method and an electroless plating method. The electroplating method includes, for example, an electroplating method using an alkyl sulfonic acid bath, a Ferrostan bath, a halogen bath and the like, and the present invention is not limited only to those exemplified ones.

It is preferred that the thickness of a Sn-plating layer formed on the stainless steel sheet is 0.3 µm or more from the viewpoint of suppression of generation of a whisker and increase in adhesive strength of a Sn-plating layer to a Ni-plating layer, and that the thickness is 3 µm or less since smoothness of a plating layer formed on the stainless steel sheet is lowered, and it will not be advantageous in cost when the Sn-plating layer is so thick.

As mentioned above, when the composition, temperature and current density of a plating bath and the like are controlled in Ni-plating, a Ni-plating layer having a thickness of 0.3 to 3 μm is formed on a stainless steel sheet, a Sn-plating layer having a thickness of 0.3 to 5 μm is formed on the Ni-plating layer, and a Sn-plated stainless steel sheet having a lattice distortion of a Ni crystal of the Ni-plating layer of 0.5% or less is obtained. The Sn-plated stainless steel sheet obtained in the above has a Sn-plating layer excellent in adhesion to the stainless steel sheet, and is excellent in whisker resistance under various environments. Therefore, the Sn-plated stainless steel sheet can be suitably used for electrical contact components such as a connector, a lead frame and a harness plug which are used in electrical equipment, electronic equipment and the like.

Incidentally, generation of a whisker in the Sn-plated stainless steel sheet of the present invention can be suppressed without carrying out a reflow treatment.

EXAMPLES

Next, the present invention is more specifically described based on working examples. However, the present invention is not limited only to the examples.

In the following examples and comparative examples, two kinds of a stainless steel sheet shown in Table 1 were used. The sheet thickness, Arithmetical mean deviation of roughness profile Ra and chemical composition of the stainless steel sheet are shown in Table 1.

TABLE 1

| Stainless steel sheet | Kind of steel | Sheet thickness (mm) | Arithmetical mean deviation of roughness profile Ra (μm) | Chemical composition of stainless steel sheet (% by mass) | | | | | | |
|---|---|---|---|---|---|---|---|---|---|---|
| | | | | C | Si | Mn | P | S | Ni | Cr |
| A | SUS 430 | 0.2 | 0.17 | 0.069 | 0.52 | 0.33 | 0.028 | 0.002 | 0.14 | 16.12 |
| B | SUS 304 | 0.3 | 0.25 | 0.070 | 0.50 | 0.78 | 0.029 | 0.007 | 8.05 | 18.20 |

Incidentally, the Arithmetical mean deviation of roughness profile Ra of the stainless steel sheet s was determined on the basis of the following method.
[Measurement Method of Arithmetical Mean Deviation of Roughness Profile Ra]

A test piece having a length of 50 mm and a width of 50 mm was obtained by cutting each stainless steel sheet. The test piece was washed with acetone by means of ultrasonic cleaning, and then the Arithmetical mean deviation of roughness profile Ra of the test piece was determined in accordance with JIS B0601. The Arithmetical mean deviation of roughness profile Ra of the test piece was determined three times in the direction perpendicular to the rolling direction of the test piece, and its average was calculated.

Example 1

The stainless steel sheet A was used as the stainless steel sheet, and alkaline degreasing of the stainless steel sheet A was carried out under the following conditions. Thereafter, acid cleaning of the stainless steel sheet A was carried out under the following conditions:
  [Conditions of Alkaline Degreasing]
   Degreasing liquid: sodium orthosilicate 50 g/L
   Degreasing conditions:
    Bath temperature: 60° C.
    Current density: 5 A/dm$^2$
    Electrolysis period of time: anode 5 seconds→cathode 5 seconds
  [Conditions of Acid Cleaning]
   Acid cleaning liquid: sulfuric acid 50 g/L
   Acid cleaning conditions:
    Bath temperature: 50° C.
    Dipping period of time: 5 seconds Next, strike Ni-plating of the stainless steel sheet A to which acid cleaning was conducted in the above was carried out under the following conditions, to form a Ni-plating layer having a thickness of 1.0 μm on the stainless steel sheet A.
[Conditions of Strike Ni-Plating]
  Ni-plating bath (sulfate only bath): nickel sulfate 300 g/L, sulfuric acid 20 g/L (pH: 1.8)
  Bath temperature of plating bath: 50° C.
  Current density: 8 A/dm$^2$ Next, Sn-plating of the stainless steel sheet on which the Ni-plating layer was formed was carried out under the following conditions, to form a Sn-plating layer having a thickness of 3.0 μm on the Ni-plating layer of the stainless steel sheet, and thereby a Sn-plated stainless steel sheet was obtained.
[Conditions of Sn-Plating]
  Sn-plating bath [available from C. Uyemura & Co., Ltd. under the product name: TYNADES GHS-51] (Sn$^{2+}$ 50 g/L, free acid 120 mL/L) (pH: 0.2)
  Anode: Sn plate
  Bath temperature: 35° C.
  Current density: 10 A/dm$^2$ Both of the thickness of the Ni-plating layer and the thickness of the Sn-plating layer were measured on the basis of the following method.
[Method for Measuring Thickness of Ni-Plating Layer and Thickness of Sn-Plating Layer]

Both of the thickness of the Ni-plating layer and the thickness of the Sn-plating layer were measured on the basis of "Electrolytic testing method" prescribed in JIS H8501 by using an electrolytic plating thickness tester (available from CHUO SEISAKUSHO, LTD.).

Figure 1:
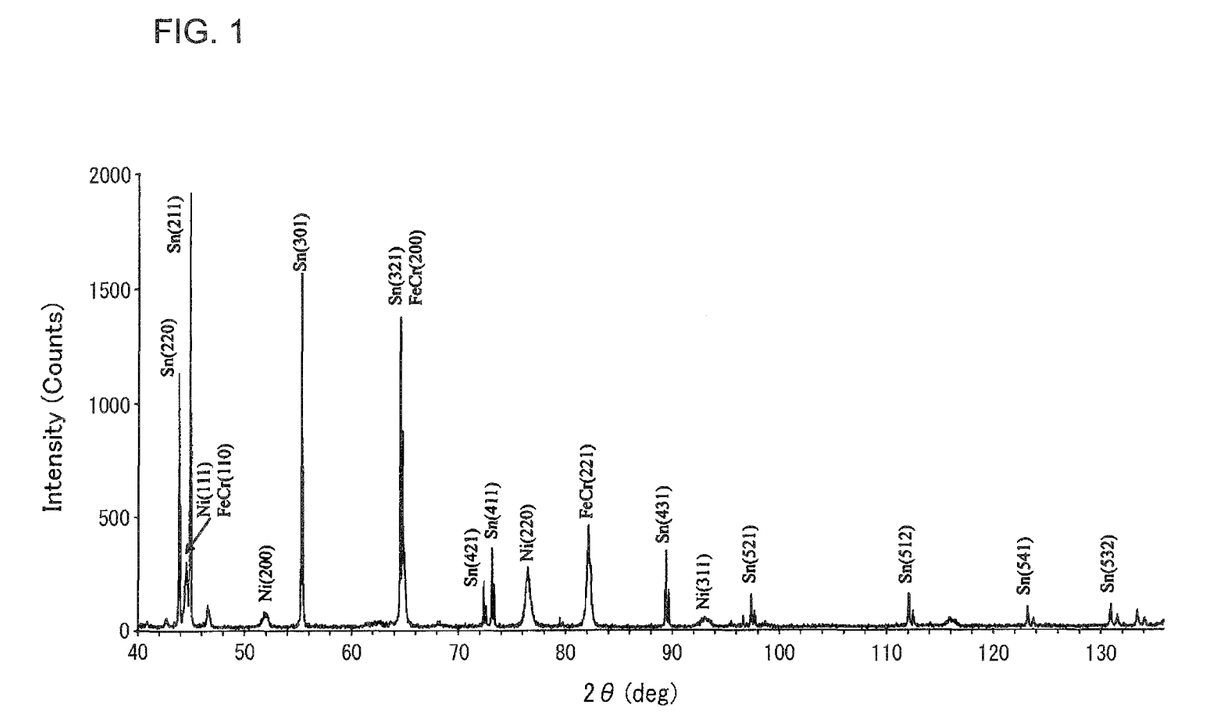
FIG. 1 is an X-ray diffraction pattern of a Sn-plated stainless steel sheet obtained in Example 1.

Next, in order to determine the lattice distortion of a Ni crystal of the Ni-plating layer, a wide angle X-ray diffractometer [available from Rigaku Corporation under the model number: RINT-TTR III type, X-ray source: CuKα rays, tube voltage: 50 kV, tube current: 300 mA, step width: 0.02°, measurement speed: 1 sec/step, slit: 0.5°-0.15 mm-0.5°, diffraction line curved monochromator] was used, to give an X-ray diffraction pattern of a Sn-plated stainless steel sheet. The X-ray diffraction pattern of a Sn-plated stainless steel sheet obtained in the above is shown in FIG. 1.

Next, the lattice distortion of a Ni crystal of the Ni-plating layer was determined on the basis of the following method. The results are shown in Table 2.

[Method for Measuring Lattice Distortion of a Ni Crystal]

On the basis of the X-ray diffraction pattern obtained in the above, a lattice distortion of a Ni crystal was determined in accordance with a method described at page 163 of "JEOL Application Note XR-23, "Principle and application of X-ray diffraction method (X-SEN KAISETSUHO NO GENRI TO OYO)" [Toshio SAKAMAKI, 1992, JEOL Ltd.] by using a peak integral width analyzing software [available from MDI (Materials Date Inc.), product number: JADE7] from peaks of Ni, which are not overlapped with the peaks of diffraction lines ascribed to Sn and the stainless steel sheet used as a base material, which are included in peaks of diffraction lines ascribed to Ni in the Ni-plating layer of a Sn-plated stainless steel sheet, that is, respective peak area and respective peak position of the diffraction lines at three faces corresponding to Miller indexes of Ni[200], Ni[220] and Ni[311]. More specifically, the lattice distortion of a Ni crystal of the Ni-plating layer of a Sn-plated stainless steel sheet was determined by the following method. By using the above-mentioned X-ray diffractometer, integral widths β1 to β3 and Bragg angles θ1 to θ3 of three diffraction lines of Ni corresponding to Miller indexes of Ni[200], Ni[220] and Ni[311] were determined. The $\beta^2/\tan^2\theta$ and the $\beta/\tan\theta \sin\theta$ satisfy the relationship represented by the equation:

$$\beta^2/\tan^2\theta = \lambda/\epsilon \times \beta/\tan\theta \sin\theta + 4\eta^2$$

wherein β is an integral width, λ is a wavelength of X-ray, ε is a length of a crystal lattice, and η is a lattice strain. Therefore, the $\beta^2/\tan^2\theta$ was taken as a Y axis, the $\beta/\tan\theta \sin\theta$ was taken as an X axis, and a linear approximate curve was drawn by using a minimum square method. The lattice distortion was determined from the Y-axis intercept of a straight line having a correlation coefficient of 0.9 or more.

Next, as the characteristics of the Sn-plated stainless steel sheet obtained in the above, adhesion property and number of whiskers generated were examined in accordance with the following methods. The results are shown in Table 2.

[Adhesion Property]

As a test piece, a Sn-plated stainless steel sheet was used. Each of ten pieces of test piece was subjected to a 180° bending test for adhesion, and a cellophane adhesive tape was stuck to the outer surface of a bent part in accordance with JIS Z1522. Thereafter, the cellophane adhesive tape was peeled off, and the adhesion of the plating layer was observed with naked eyes. The adhesion property was evaluated in accordance with the following evaluation criteria. Incidentally, the evaluation of adhesive property of ○ or ⊙ satisfies acceptance criterion of adhesion property.

(Evaluation Criteria)

⊙: Number of a test piece in which a plating layer is stuck to the cellophane adhesive tape is 0 (adhesion property of plating layer is excellent).

○: Number of a test piece in which a plating layer is stuck to the cellophane adhesive tape is 1 to 3 (adhesion property of the plating layer is favorable).

x: Number of a test piece in which a plating layer is stuck to the cellophane adhesive tape is 4 to 10 (adhesion property of the plating layer is bad).

[Number of Whiskers Generated Under High-Temperature and High-Humidity Environment]

A Sn-plated stainless steel sheet was cut into a size of 15 mm in longitudinal length and 15 mm in transversal length, to give three test pieces. The three test pieces were placed in a thermo-hygrostat chamber having a temperature of 85° C. and a relative humidity of 85%, and maintained for 2000 hours. Thereafter, the test pieces were taken out from the thermo-hygrostat chamber.

A random area of 10 mm×10 mm of each test piece which was taken out from the thermo-hygrostat chamber was observed with a scanning electron microscope, to count the number of whiskers having a length of 10 μm or more. A test piece having a largest number of whiskers per one test piece was chosen from the three test pieces, and the number of whiskers was defined as a number of whiskers generated. Incidentally, when the number of whiskers generated is 0, the test piece satisfies acceptance criterion.

[Number of Whiskers Generated Under Environment Having Sudden Change in Temperature]

A Sn-plated stainless steel sheet was cut into a size of 15 mm in longitudinal length and 15 mm in transversal length, to give three test pieces. The three test pieces were placed in a thermo-hygrostat chamber. A test for changing the temperature in the chamber from −40° C. to 85° C. over a period of 30 minutes was repeatedly carried out 1000 cycles, and then the test pieces were taken out from the thermo-hygrostat chamber.

The test pieces which were taken out from the thermo-hygrostat chamber were observed with a scanning electron microscope in the same manner as in the above, to examine the number of whiskers generated. Incidentally, when the number of whiskers generated is 0, the test piece satisfies acceptance criterion.

Example 2

A Sn-plated stainless steel sheet was produced in the same manner as in Example 1 except that a stainless steel sheet B was used as the stainless steel sheet, and that the film thickness of the Ni-plating layer and the film thickness of the Sn-plating layer were changed to those listed in Table 2. The lattice distortion of a Ni crystal of the Ni-plating layer of the Sn-plated stainless steel sheet obtained in the above and characteristics of the Sn-plated stainless steel sheet were examined in the same manner as in Example 1. The results are shown in Table 2.

Examples 3 to 8

As a stainless steel, a stainless steel sheet A or a stainless steel sheet B shown in Table 2 was used. A Ni-strike plating layer was formed on the surface of the stainless steel sheet in the same manner as in Example 1 except that the film thickness of the Ni-plating layer formed by strike Ni-plating was changed to 0.2 μm. Thereafter, Ni-plating of the sheet was carried out as regular Ni-plating under the following conditions, and the thickness of the whole Ni-plating layer was controlled so as to be a thickness shown in Table 2, to form a Ni-plating layer on the surface of the stainless steel sheet.

[Conditions of Ni-Regular Plating]

Ni-plating bath (Watts bath): nickel sulfate 300 g/L, nickel chloride 45 g/L, boric acid 35 g/L (pH: 3.9)

Plating conditions

Bath temperature: 50° C.

Current density: 8 A/dm²

Next, a Sn-plated stainless steel sheet was produced in the same manner as in Example 1 except that the thickness of a Sn-plating layer was controlled to a thickness shown in Table 2. The lattice distortion of a Ni crystal of the Ni-plating layer of the Sn-plated stainless steel sheet obtained in the above and characteristics of the Sn-plated stainless steel sheet were examined in the same manner as in Example 1. The results are shown in Table 2.

Example 9

As a stainless steel sheet, a stainless steel sheet A was used, and alkaline degreasing, acid cleaning and Ni-strike plating of the stainless steel sheet A was carried out in the same manner as in Example 3. Thereafter, regular Ni-plating of the stainless steel sheet A was carried out under the following conditions, and the thickness of the whole Ni-plating layer was controlled to a thickness shown in Table 2, to form a Ni-plating layer on the surface of the stainless steel sheet.

[Conditions of Ni-Regular Plating]
Ni-plating bath (sulfamate bath): nickel chloride 15 g/L, nickel sulfamate 400 g/L, nickel bromide 38 g/L (pH: 4.2)
Plating conditions
Bath temperature: 50° C.
Current density: 8 A/dm$^2$ Next, a Sn-plated stainless steel sheet was produced in the same manner as in Example 1 except that the thickness of the Sn-plating layer was controlled to a thickness shown in Table 2. The lattice distortion of a Ni crystal of the Ni-plating layer of the Sn-plated stainless steel sheet obtained in the above and characteristics of the Sn-plated stainless steel sheet were examined in the same manner as in Example 1. The results are shown in Table 2.

Figure 2:
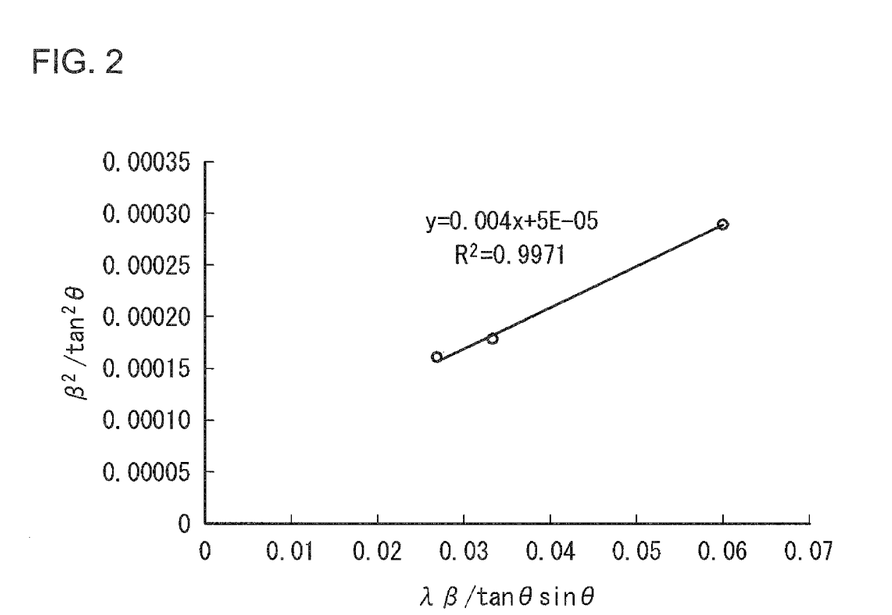
FIG. 2 is a graph showing a measurement result of lattice strain of Ni crystals of a Ni-plating layer of a Sn-plated stainless steel sheet obtained in Example 9.

As one example of the measurement results of length ($\epsilon$) of the Ni crystal lattice and lattice distortion of a Ni crystal of the Sn-plated stainless steel sheet, a lattice strain ratio of a Ni crystal of the Ni-plating layer of the stainless steel sheet obtained in Example 9 was determined for reference. The measurement results are shown in FIG. 2. The Sn-plated stainless steel sheet obtained in Example 9 had 0.0039 of 1/$\epsilon$ and 0.0000502 of 4$\eta^2$. From these results, it was confirmed that the length ($\epsilon$) of the Ni crystal lattice was 250 nm and that the lattice distortion of the Ni crystal was 0.35%.

Examples 10 to 12

As a stainless steel sheet, a stainless steel sheet A or a stainless steel sheet B shown in Table 2 was used, and alkaline degreasing, acid cleaning and strike Ni-plating were carried out in the same manner as in Example 3 except that a bath temperature in the acid cleaning was controlled to room temperature. Thereafter, regular Ni-plating was carried out by using the above-mentioned sulfate only bath in Example 10, the above-mentioned Watts bath in Example 11 and the above-mentioned sulfamate bath in Example 12, and the film thickness of the Ni-plating layer was controlled to a thickness shown in Table 2, to form a Ni-plating layer on the surface of the stainless steel sheet.

Next, Sn-plating of the stainless steel sheet on which a Ni-plating layer was formed obtained in the above was carried out in the same manner as in Example 1, to give a Sn-plated stainless steel sheet having a Sn-plating layer of a thickness shown in Table 2. The lattice distortion of a Ni crystal of the Ni-plating layer of the Sn-plated stainless steel sheet and characteristics of the Sn-plated stainless steel sheet were examined in the same manner as in Example 1. The results are shown in Table 2.

Comparative Example 1

Aa a stainless steel sheet, a stainless steel A was used, and alkaline degreasing, acid cleaning and Ni-regular plating were carried out to control the film thickness of the whole Ni-plating layer to a thickness shown in Table 2 in the same manner as in Example 3 except that strike Ni-plating of the stainless steel sheet A was not carried out, to form a Ni-plating layer on the surface of the stainless steel sheet.

Next, Sn-plating of the stainless steel sheet A on which a Ni-plating layer was formed was carried out in the same manner as in Example 1, to give a Sn-plated stainless steel sheet having a Sn-plating layer of a thickness shown in Table 2. The lattice distortion of a Ni crystal of the Ni-plating layer of the Sn-plated stainless steel sheet and characteristics of the Sn-plated stainless steel sheet were tried to be examined in the same manner as in Example 1. However, the evaluation for the number of whiskers generated was not carried out because adhesion of Ni-plating was not so good.

Comparative Example 2

As a stainless steel sheet, a stainless steel sheet B was used, and alkaline degreasing, acid cleaning and Ni-regular plating were carried out to control the film thickness of the whole Ni-plating layer to a thickness shown in Table 2 in the same manner as in Example 9 except that strike Ni-plating of the stainless steel sheet B was not carried out, to form a Ni-plating layer on the surface of the stainless steel sheet.

Next, Sn-plating of the stainless steel sheet A on which a Ni-plating layer was formed obtained in the above was carried out in the same manner as in Example 1, to give a Sn-plated stainless steel sheet having a Sn-plating layer of a thickness shown in Table 2. The lattice distortion of a Ni crystal of the Ni-plating layer of the Sn-plated stainless steel sheet and characteristics of the Sn-plated stainless steel sheet were tried to be examined in the same manner as in Example 1. However, the evaluation for the number of whiskers generated was not carried out because adhesion of Ni-plating was not so good.

Comparative Examples 3 to 5

As a stainless steel sheet, a stainless steel sheet A or a stainless steel sheet B shown in Table 2 was used, and alkaline degreasing and acid cleaning were carried out in the same manner as in Example 1. Then, strike Ni-plating was carried out under the condition of strike Ni-plating shown below so that a thickness of the Ni-plating layer was controlled to 0.2 µm. Thereafter, regular Ni-plating was carried out by using the above-mentioned sulfate only bath in Comparative Example 3, the above-mentioned Watts bath in Comparative Example 4 and the above-mentioned sulfamate bath in Comparative Example 5, and the thickness of the whole Ni-plating layer was controlled to a thickness shown in Table 2, to form a Ni-plating layer on the surface of the stainless steel sheet.

[Conditions of Strike Ni-Plating]
Ni-plating bath (Wood's bath): nickel chloride 240 g/L, hydrochloric acid 125 mL/L (pH: 1.2)
Plating conditions
Bath temperature: 35° C.
Current density: 8 A/dm$^2$ Next, Sn-plating of the stainless steel sheet on which a Ni-plating layer was formed obtained in the above was carried out in the same manner as in Example 1, to give a Sn-plated stainless steel sheet having a Sn-plating layer of thickness shown in Table 2, and lattice distortion of a Ni crystal of the Ni-plating layer of the Sn-plated stainless steel sheet and characteristics of the Sn-plated stainless steel sheet were examined in the same manner as in Example 1. The results are shown in Table 2.

Comparative Examples 6 to 8

As a stainless steel sheet, a stainless steel sheet A or a stainless steel sheet B shown in Table 2 was used, and alkaline degreasing, acid cleaning and strike Ni-plating were carried out in the same manner as in Comparative Example 3 except that the acid cleaning was carried out at a bath temperature of 50° C. Thereafter, regular Ni-plating was carried out by using the above-mentioned sulfate only bath in Comparative Example 6, the above-mentioned Watts bath in Comparative Example 7 and the above-mentioned sulfamate bath in Comparative Example 8 to control the thickness of the whole Ni-plating layer to a thickness shown in Table 2, to form a Ni-plating layer on the surface of the stainless steel sheet.

Next, Sn-plating of the stainless steel sheet on which a Ni-plating layer was formed obtained in the above was carried out in the same manner as in Example 1, to give a Sn-plated stainless steel sheet having a Sn-plating layer of a thickness shown in Table 2, and the lattice distortion of a Ni crystal of the Ni-plating layer of the Sn-plated stainless steel sheet and characteristics of the Sn-plated stainless steel sheet were examined in the same manner as in Example 1. The results are shown in Table 2.

Comparative Example 9

As a stainless steel sheet, a stainless steel sheet A was used, alkaline degreasing and acid cleaning were carried out in the same manner as in Example 1 except that the acid cleaning was carried out at a bath temperature of room temperature in accordance with the description in WO 1999/025486. Thereafter, strike Ni-plating was carried out under the conditions of strike Ni-plating shown below so that the thickness of the Ni-plating layer was controlled to 0.2 μm.

Next, the film thickness of the whole Ni-plating layer was controlled to a thickness shown in Table 2 by using the above-mentioned Watts bath, to form a Ni-plating layer on the surface of the stainless steel sheet A to which strike Ni-plating was conducted.

[Conditions of Strike Ni-Plating]
Ni-plating bath: nickel sulfate 200 g/L, sulfuric acid 50 g/L (pH: 0.5)
Bath temperature of plating bath: 45° C.
Current density: 8 A/dm$^2$ Next, Sn-plating of the stainless steel sheet on which a Ni-plating layer was formed obtained in the above was carried out by using a Ferrostan bath, to give a Sn-plated stainless steel sheet having a Sn-plating layer of a thickness shown in Table 2, and the lattice distortion of a Ni crystal of the Ni-plating layer of the Sn-plated stainless steel sheet and characteristics of the Sn-plated stainless steel sheet were examined in the same manner as in Example 1. The results are shown in Table 2.

Comparative Examples 10 and 11

As a stainless steel sheet, a stainless steel sheet A or a stainless steel sheet B shown in Table 2 was used, and a Sn-plated stainless steel sheet was produced in the same manner as in Example 1 except that the film thickness of the Ni-plating layer and the thickness of the Sn-plating layer were changed to those shown in Table 2. The lattice distortion of a Ni crystal of the Ni-plating layer of the Sn-plated stainless steel sheet obtained in the above and characteristics of the Sn-plated stainless steel sheet were examined in the same manner as in Example 1. The results are shown in Table 2.

TABLE 2

| Ex. and Comp. Ex. No. | Kind of stainless steel sheet | Forming conditions of Ni-plating layer | | | | | Thickness of whole Ni-plating layer (μm) |
|---|---|---|---|---|---|---|---|
| | | Acid cleaning Temperature | Strike Ni-plating | | Ni-regular plating | | |
| | | | Plating bath | Thickness of plating layer (μm) | Plating bath | Thickness of plating layer (μm) | |
| Ex. 1 | A | 50° C. | Sulfate only | 1.0 | Not used | — | 1.0 |
| Ex. 2 | B | 50° C. | Sulfate only | 0.5 | Not used | — | 0.5 |
| Ex. 3 | A | 50° C. | Sulfate only | 0.2 | Watts | 0.8 | 1.0 |
| Ex. 4 | B | 50° C. | Sulfate only | 0.2 | Watts | 0.1 | 0.3 |
| Ex. 5 | A | 50° C. | Sulfate only | 0.2 | Watts | 2.8 | 3.0 |
| Ex. 6 | B | 50° C. | Sulfate only | 0.2 | Watts | 0.3 | 0.5 |
| Ex. 7 | A | 50° C. | Sulfate only | 0.2 | Watts | 0.8 | 1.0 |
| Ex. 8 | B | 50° C. | Sulfate only | 0.2 | Watts | 0.5 | 0.7 |
| Ex. 9 | A | 50° C. | Sulfate only | 0.2 | Sulfamate | 1.3 | 1.5 |
| Ex. 10 | B | Room temp. | Sulfate only | 0.2 | Sulfate only | 0.5 | 0.7 |
| Ex. 11 | A | Room temp. | Sulfate only | 0.2 | Watts | 0.5 | 0.7 |
| Ex. 12 | B | Room temp. | Sulfate only | 0.2 | Sulfamate | 0.5 | 0.7 |
| Comp. Ex. 1 | A | 50° C. | Not used | — | Watts | 1.0 | 1.0 |
| Comp. Ex. 2 | B | 50° C. | Not used | — | Sulfamate | 0.5 | 0.5 |
| Comp. Ex. 3 | A | Room temp. | Wood's | 0.2 | Sulfate only | 0.5 | 0.7 |
| Comp. Ex. 4 | B | Room temp. | Wood's | 0.2 | Watts | 0.1 | 0.3 |
| Comp. Ex. 5 | A | Room temp. | Wood's | 0.2 | Sulfamate | 0.2 | 0.4 |
| Comp. Ex. 6 | B | 50° C. | Wood's | 0.2 | Sulfate only | 0.5 | 0.7 |
| Comp. Ex. 7 | A | 50° C. | Wood's | 0.2 | Watts | 1.3 | 1.5 |
| Comp. Ex. 8 | B | 50° C. | Wood's | 0.2 | Sulfamate | 0.8 | 1.0 |
| Comp. Ex. 9 | A | Room temp. | Sulfate only | 0.2 | Watts | 2.0 | 2.2 |
| Comp. Ex. 10 | A | 50° C. | Sulfate only | 0.2 | Not used | — | 0.2 |
| Comp. Ex. 11 | B | 50° C. | Sulfate only | 0.2 | Not used | — | 0.2 |

TABLE 2-continued

|  | Thickness of Sn-plating layer (μm) | lattice distortion of Ni crystal (%) | Characteristics of Sn-plated stainless steel sheet | | |
|---|---|---|---|---|---|
| Ex. and Comp. Ex. No. | | | Adhesion | Number of whiskers generated | |
| | | | | Under high-temp. and high-humidity environment | Under environment of sudden change in temp. |
| Ex. 1 | 3.0 | 0.00 | ⊙ | 0 | 0 |
| Ex. 2 | 2.7 | 0.08 | ⊙ | 0 | 0 |
| Ex. 3 | 2.0 | 0.25 | ⊙ | 0 | 0 |
| Ex. 4 | 0.5 | 0.27 | ⊙ | 0 | 0 |
| Ex. 5 | 5.0 | 0.50 | ⊙ | 0 | 0 |
| Ex. 6 | 0.3 | 0.44 | ⊙ | 0 | 0 |
| Ex. 7 | 5.0 | 0.39 | ⊙ | 0 | 0 |
| Ex. 8 | 1.0 | 0.30 | ⊙ | 0 | 0 |
| Ex. 9 | 3.0 | 0.35 | ⊙ | 0 | 0 |
| Ex. 10 | 1.0 | 0.30 | ○ | 0 | 0 |
| Ex. 11 | 1.0 | 0.36 | ○ | 0 | 0 |
| Ex. 12 | 1.0 | 0.34 | ○ | 0 | 0 |
| Comp. Ex. 1 | 1.0 | 0.68 | X | * | * |
| Comp. Ex. 2 | 1.5 | 0.72 | X | * | * |
| Comp. Ex. 3 | 1.0 | 0.58 | ○ | 4 | 3 |
| Comp. Ex. 4 | 0.3 | 0.71 | ○ | 27 | 10 |
| Comp. Ex. 5 | 1.5 | 0.70 | ○ | 25 | 7 |
| Comp. Ex. 6 | 1.0 | 0.55 | ○ | 8 | 4 |
| Comp. Ex. 7 | 2.0 | 0.60 | ○ | 15 | 12 |
| Comp. Ex. 8 | 5.0 | 0.66 | ○ | 19 | 7 |
| Comp. Ex. 9 | 0.7 | 0.52 | ○ | 10 | 8 |
| Comp. Ex. 10 | 2.0 | 0.02 | ○ | 14 | 2 |
| Comp. Ex. 11 | 3.0 | 0.09 | ○ | 17 | 5 |

(Note)
*: Number of whiskers generated was not determined because of poor adhesion of a plating layer.

According to Comparative Examples 1 and 2, the Sn-plated stainless steel sheet was poor in adhesion of plating since strike Ni-plating was not employed. According to Comparative Examples 3 to 9, since the lattice distortion of the Ni-plating layer exceeded 0.5% due to carrying out of strike Ni-plating which generated hydrogen in a large amount, whiskers were generated under an environment having a sudden change in temperatures. According to Comparative Examples 10 and 11, whiskers were generated because the thickness of the Ni-plating layer was too small.

In contrast, the Sn-plated stainless steel sheet obtained in each Example had a Ni-plating layer of a desired thickness and a Sn-plating layer of a desired thickness, and the lattice distortion of a Ni crystal of the Ni-plating layer was 0.5% or less. Therefore, it can be seen that generation of whiskers was suppressed, and adhesion of a plating layer to a stainless steel sheet was favorable.

INDUSTRIAL APPLICABILITY

The Sn-plated stainless steel sheet of to the present invention is expected to be used for, for example, electrical contact components such as a connector, a lead frame and a harness plug which are used in electrical equipment, electronic equipment and the like.

The invention claimed is:

1. A Sn-plated stainless steel sheet, comprising:
   a stainless steel sheet;
   a Ni-plating layer having a thickness of 0.3 to 3 μm formed on the stainless steel sheet; and
   a Sn-plating layer having a thickness of 0.3 to 5 μm formed on the Ni-plating layer,
   wherein a Ni crystal of the Ni-plating layer has a lattice distortion of 0.5% or less.

2. The Sn-plated stainless steel sheet according to claim 1, to which a reflow treatment has not been subjected.

* * * * *